(12) United States Patent
Steele, Jr.

(10) Patent No.: US 7,444,367 B2
(45) Date of Patent: Oct. 28, 2008

(54) FLOATING POINT STATUS INFORMATION ACCUMULATION CIRCUIT

(75) Inventor: Guy L. Steele, Jr., Lexington, MA (US)

(73) Assignee: Sun Microsystems, Inc., Menlo Park, CA (US)

( * ) Notice: Subject to any disclaimer, the term of this patent is extended or adjusted under 35 U.S.C. 154(b) by 1346 days.

(21) Appl. No.: 10/035,587

(22) Filed: Dec. 28, 2001

(65) Prior Publication Data

US 2002/0178204 A1 Nov. 28, 2002

Related U.S. Application Data

(60) Provisional application No. 60/293,173, filed on May 25, 2001.

(51) Int. Cl.
*G06F 7/00* (2006.01)
(52) U.S. Cl. .................................................... 708/525
(58) Field of Classification Search ................. 708/505, 708/525
See application file for complete search history.

(56) References Cited

U.S. PATENT DOCUMENTS

| | | | |
|---|---|---|---|
| 3,725,649 A | 4/1973 | Deerfield | |
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams | 364/748 |
| 5,347,482 A | 9/1994 | Williams | 364/757 |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A | 8/1999 | Orup | |
| 5,953,241 A | 9/1999 | Hansen et al. | |
| 5,963,461 A | 10/1999 | Gorshtein et al. | |

(Continued)

OTHER PUBLICATIONS

U.S. Appl. No. 10/320,547, filed Dec. 17, 2002, Steele, Jr.

(Continued)

*Primary Examiner*—Tan V Mai
(74) *Attorney, Agent, or Firm*—Sonnenschein Nath & Rosenthal LLP (57) ABSTRACT

A floating point flag combining or accumulating circuit includes an analysis circuit that receives a plurality of floating point operands, each having encoded status flag information, and a result assembler. The analysis circuit analyzes the plurality of floating point operands and provides an indication of one or more predetermined formats in which the plurality of floating point operands are represented. The result assembler receives the indication from the analysis circuit and assembles an accumulated result that represents a value and combines the encoded status flag information from at least two of the plurality of floating point operands.

47 Claims, 2 Drawing Sheets

U.S. PATENT DOCUMENTS

| | | | |
|---|---|---|---|
| 5,978,901 A * | 11/1999 | Luedtke et al. | 708/525 |
| 5,995,991 A | 11/1999 | Huang et al. | |
| 6,009,511 A | 12/1999 | Lynch et al. | 712/222 |
| 6,049,865 A | 4/2000 | Smith | |
| 6,081,823 A | 6/2000 | Purcell et al. | |
| 6,105,047 A | 8/2000 | Sharangpani et al. | |
| 6,108,772 A | 8/2000 | Sharangpani | |
| 6,131,106 A | 10/2000 | Steele, Jr. | 708/510 |
| 6,138,135 A | 10/2000 | Karp | |
| 6,151,669 A | 11/2000 | Huck et al. | |
| 6,189,094 B1 | 2/2001 | Hinds et al. | |
| 6,205,460 B1 | 3/2001 | Steele, Jr. | |
| 6,219,685 B1 | 4/2001 | Story | |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 * | 5/2002 | Meier et al. | 712/222 |
| 6,490,607 B1 | 12/2002 | Oberman | |
| 6,571,265 B1 | 5/2003 | Story | |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 | 5/2004 | Rosenberg et al. | |
| 6,789,098 B1 * | 9/2004 | Dijkstra | 708/495 |
| 2002/0194232 A1 | 12/2002 | Walster | |
| 2003/0033335 A1 | 2/2003 | Walster | |

OTHER PUBLICATIONS

U.S. Appl. No. 10/320,450, filed Dec. 17, 2002, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.

Title: "Safe Treatment of Overflow and Underflow Conditions", by Robert A. Fraley & J. Stephen Walther, Hewlett-Packard Co., pp. 1-5.

Title: "Vax Floating Point: A Solid Foundation for Numerical Computation", by Mary Payne & Dileep Bhandarkar, Digital Equipment Corp., pp. 1-12.

Title: Lecture Notes on the Status of "IEEE Standard 754 for Binary Floating-Point Arithmetic", by Prof. W. Kahan, May 31, 1996, pp. 1-30.

Title: "Interval Arithmetic Specification" by Dmitri Chiriaev & G. William Walster, Draft revised May 4, 1998, pp. 1-78.

Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

* cited by examiner

FLOATING POINT STATUS INFORMATION ACCUMULATION CIRCUIT

Applicant claims the right of priority based on U.S. Provisional Patent Application No. 60/293,173 filed May 25, 2001 in the name of Guy L. Steele, Jr.

INCORPORATION BY REFERENCE

Related U. S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

FIELD OF THE INVENTION

The invention relates generally to systems and methods for performing floating point operations, and more particularly to systems and methods for accumulating floating point status information associated with a plurality of floating point values.

BACKGROUND OF THE INVENTION

Digital electronic devices, such as digital computers, calculators, and other devices, perform arithmetic calculations on values in integer or "fixed point" format, in fractional or "floating point" format, or both. IEEE Standard 754 (hereinafter "IEEE Std. 754" or "the Standard"), published in 1985 by the Institute of Electrical and Electronic Engineers and adopted by the American National Standards Institute (ANSI), defines several standard formats for expressing values in floating point format and a number of aspects regarding behavior of computation in connection therewith. In accordance with IEEE Std. 754, a representation in floating point format comprises a plurality of binary digits, or "bits," having the structure $$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field that represents the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits $f_{msb} \ldots f_{lsb}$ comprising the fraction field. If a number is represented such that all of the bits "$e_{msb} \ldots e_{lsb}$" of the exponent field are binary one's (i.e., if the bits represent a binary-encoded value of "255" in the single format or "2047" in the double format) and all of the bits $f_{msb} \ldots f_{lsb}$ of the fraction field are binary zeros, then the value of the number is positive or negative infinity, depending on the value of the sign bit "s". In particular, the value "v" is $v=(-1)^s\infty$, where "$\infty$" represents the value of "infinity." On the other hand, if all of the bits "$e_{msb} \ldots e_{lsb}$" of the exponent field are binary one's and if the bits $f_{msb} \ldots f_{lsb}$ of the fraction field are not all zero's, then the value that is represented is deemed "not a number," abbreviated in the Standard by "NaN."

If a number has an exponent field in which the bits "$e_{msb} \ldots e_{lsb}$" are neither all binary ones nor all binary zeros (i.e., if the bits represent a binary-encoded value between 1 and 254 in the single format or between 1 and 2046 in the double format), the number is said to be in a "normalized" format. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be in a "denormalized" format. For a number in the denormalized format, the value represented by the number is $v=(-1)^s 2^{e-bias+1}(0.|f_{msb} \ldots f_{lsb})$. It will be appreciated that the range of values of numbers that can be expressed in the denormalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero" and a fraction field in which the bits $f_{msb} \ldots f_{lsb}$ are all zero, the number has the value "zero" (reference format 30). It will be appreciated that the value "zero" may be positive zero or negative zero, depending on the value of the sign bit.

Generally, floating point units to perform computations whose results conform to IEEE Std. 754 are designed to generate a result in response to a floating point instruction in three steps:

(a) In the first step, an approximation calculation step, an approximation to the absolutely accurate mathematical result (assuming that the input operands represent the specific mathematical values as described by IEEE Std. 754) is calculated that is sufficiently precise. This allows the accurate mathematical result to be summarized by a sign bit, an exponent (typically represented using more bits than are used for an exponent in the standard floating point format), and some number "N" of bits of the presumed result fraction, plus a guard bit and a sticky bit. The value of the exponent will be such that the value of the fraction generated in step (a) consists of a "1" before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); then let the N most significant bits of the infinite significand be used as the intermediate result significand, let the next bit of the infinite significand be the guard bit, and let the sticky bit be "0" if and only if all remaining bits of the infinite significand are 0-bits (in other words, the sticky bit is the logical OR of all remaining bits of the infinite fraction after the guard bit).

(b) In the second step, a rounding step, the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding "1" to the significand in its least significant bit position, as if the significand were a binary integer. It will be appreciated that, if the significand is all 1-bits, then magnitude of the number is "increased" by changing it to a high-order 1-bit followed by all 0-bits and adding "1" to the exponent.

Regarding the rounding modes, it will be further appreciated that, (i) if the result is a positive number, and
  (a) if the decision is made to increase, effectively the decision has been made to increase the value of the result, thereby rounding the result up (i.e., towards positive infinity), but
  (b) if the decision is made not to increase, effectively the decision has been made to decrease the value of the result, thereby rounding the result down (i.e., towards negative infinity); and
(ii) if the result is a negative number, and
  (a) if the decision is made to increase, effectively the decision has been made to decrease the value of the result, thereby rounding the result down, but
  (b) if the decision is made not to increase, effectively the decision has been made to increase the value of the result, thereby rounding the result up.

(c) In the third step, a packaging step, the result is packaged into a standard floating point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, it is assumed that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation will be provided as the result.

In addition, in the packaging step, floating point status information is generated, which is stored in a floating point status register. The floating point status information generated for a particular floating point operation includes indications, for example, as to whether (i) a particular operand is invalid for the operation to be performed ("invalid operation");
(ii) if the operation to be performed is division, the divisor is zero ("division-by-zero");
(iii) an overflow occurred during the operation ("overflow");
(iv) an underflow occurred during the operation ("underflow"); and
(v) the rounded result of the operation is not exact ("inexact").

These conditions are typically represented by flags that are stored in the floating point status register separate from the result itself. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating point computation and architectural design of floating point units. Moreover, its design was based on some important principles and rests on a sensible mathematical semantics that eases the job of programmers and numerical analysis. It also supports the implementation of interval arithmetic, which may prove to be preferable to simple scalar arithmetic for many tasks. Nevertheless, IEEE Std. 754 has some serious drawbacks, including:

(i) Modes (e.g., the rounding modes and traps enabled/disabled mode), flags (e.g., flags representing the status information stored in the floating point status register 25), and traps required to implement IEEE Std. 754 introduce implicit serialization issues. Implicit serialization is essentially the need for serial control of access (read/write) to and from globally used registers, such as the floating point status register 25. Under IEEE Std. 754, implicit serialization may arise between (1) different concurrent floating-point instructions and (2) between floating point instructions and the instructions that read and write the flags and modes. Furthermore, rounding modes may introduce implicit serialization because they are typically indicated as a global state, although in some microprocessor architectures, the rounding mode is encoded as part of the instruction operation code, which will alleviate this problem to that extent. Thus, the potential for implicit serialization makes the Standard difficult to implement coherently and efficiently in today's superscalar and parallel processing architectures without loss of performance.

(ii) The implicit side effects of a procedure that can change the flags or modes can make it very difficult for compilers to perform optimizations on floating point code. As a result, compilers for most languages must assume that every procedure call is an optimization barrier in order to be safe.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits.

(iv) Furthermore, traps have been difficult to integrate efficiently into architectures and programming language designs for fine-grained control of algorithmic behavior.

IEEE Std. 754 stores flag information as a global state and accumulates flag information from every operation, which makes it awkward and inefficient to accumulate flag status information from only a subset of executed operations, or to accumulate respective flag information separately and independently for a plurality of expressions, the execution of whose individual operations might be concurrent or interleaved in time.

In addition to the above drawbacks, existing computer architectures do not eliminate flags and trap enable bits as a global state, while supporting similar exception detection capabilities, even though existing computer architectures eliminate the rounding modes as a global state. This is typically done by statistically encoding the rounding mode as part of the instruction code. Examples of computer architectures that eliminate the rounding modes as a global state are demonstrated by the Digital Equipment Company ALPHA architecture, which partially eliminates the rounding modes, and Sun Microsystem's MAJC architecture, which completely eliminates the rounding modes.

Thus, there is a need for a system that avoids such problems when performing floating point operations and, in particular, when accumulating status information related to floating point operands.

SUMMARY OF THE INVENTION

Methods, systems, and articles of manufacture consistent with the present invention overcome these shortcomings with an accumulating floating point circuit that combines information associated with a plurality of floating point values. This circuit combines the value and status information associated with floating point values without the use or access to a separate floating point status register.

More particularly stated, a floating point flag combining circuit consistent with the present invention, as embodied and broadly described herein, includes an analysis circuit, which receives a plurality of floating point operands, and a result assembler. The analysis circuit analyzes the plurality of floating point operands received and provides an indication of one or more predetermined formats in which the floating point operands are represented.

The analysis circuit provides an indication that may represent predetermined formats such as an overflow, underflow, not-a-number (NaN), infinity, normalized, and denormalized format. In more detail, the predetermined format may represent a +OV status, a –OV status, a +UN status, and a –UN status. The predetermined format may also comprise a plurality of bits indicative of a predetermined type of operand condition resulting in one of the formats, such as the NAN or infinity format.

The result assembler then, based on the indication from the analysis circuit, combines the plurality of floating point operands, in the various predetermined formats, to assemble an accumulated result in the NaN format.

In yet another aspect of the present invention, a method for combining floating point status information from a plurality of floating point operands consistent with an embodiment of the present invention is described. The method comprises receiving a plurality of floating point operands, each having encoded status flag information; analyzing the plurality of floating point operands to provide indications of one or more predetermined formats in which the floating point operands are represented; generating control signals based on the indications of the one or more predetermined formats; and assembling an accumulated result from the generated control signals and other input signals. The accumulated result represents a value and combines the encoded status flag information from each of the floating point operands.

Additional advantages of the invention will be set forth in part in the description which follows, and in part will be obvious from the description, or may be learned by practicing the invention. The advantages of the invention will be realized and attained by means of the elements and combinations particularly pointed out in the appended claims.

It is to be understood that both the foregoing general description and the following detailed description are exemplary and exemplary only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF AN ILLUSTRATIVE EMBODIMENT

Reference will now be made in detail to exemplary embodiments of the present invention, examples of which are illustrated in the accompanying drawings. Wherever possible, the same reference numbers will be used throughout the drawings to refer to the same or like parts.

Related U.S. patent application Ser. No. 10/035,747, which has previously been incorporated by reference, describes an exemplary floating point unit in which floating point status information is encoded in the representations of the results generated thereby. The exemplary floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. The present application is directed to an exemplary combining or accumulation circuit that can be used as another functional unit or as part of the aforementioned functional units in the floating point unit described in related U.S. patent application Ser. No. 10/035,747, to accumulate floating point status information from a plurality of floating point values that may comprise results from a plurality of floating point operations.

Figure 1:
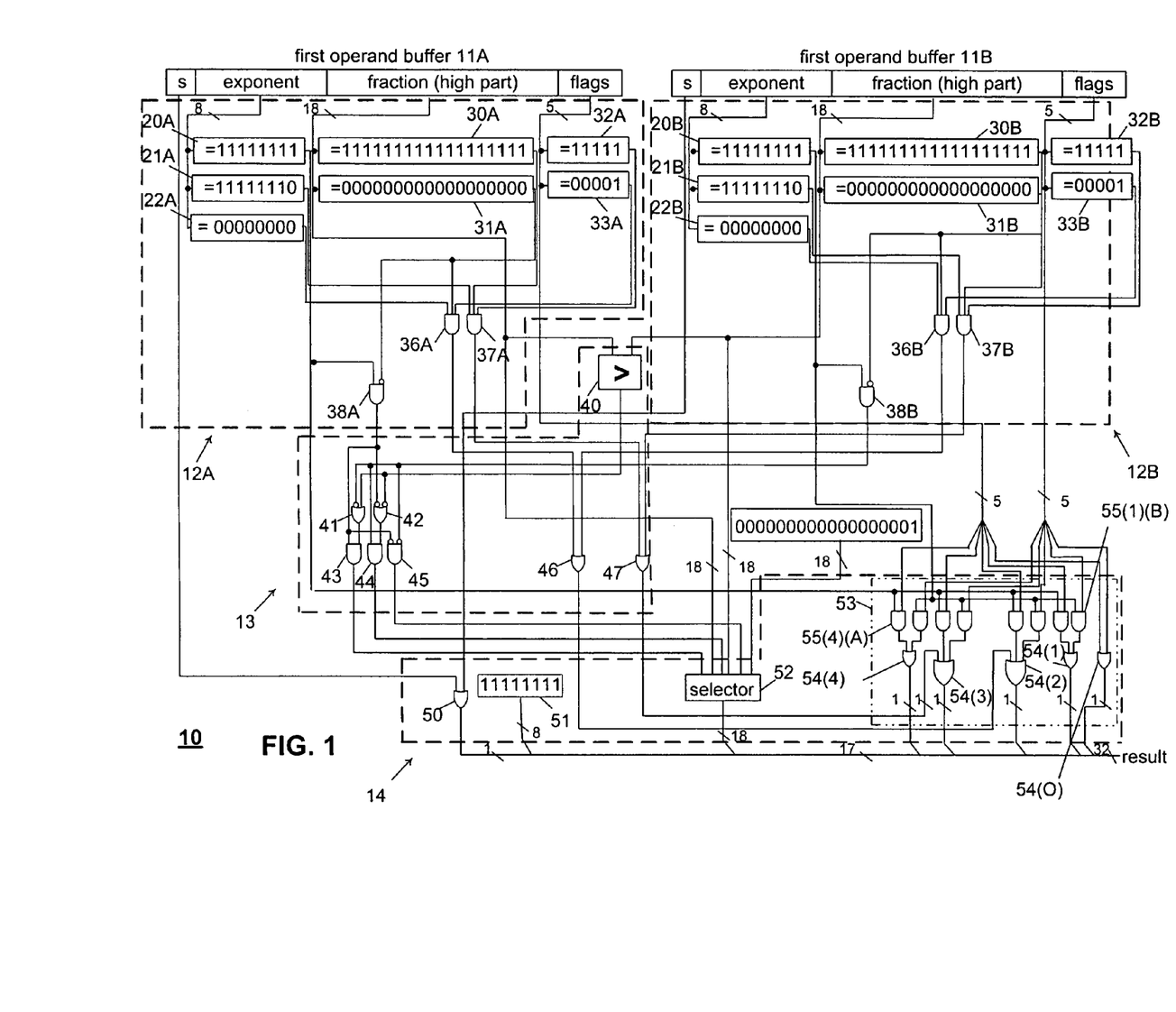
FIG. 1 is a functional block diagram of an exemplary floating point status information accumulation circuit constructed consistent with an exemplary embodiment of the present invention.

FIG. 1 is a functional block diagram of an exemplary floating point status information accumulation circuit 10 constructed in accordance with an embodiment of the invention. Generally, the floating point status information accumulation circuit 10 receives two floating point operands and generates therefrom a result, as will be described below, that accumulates floating point status information embedded in the operands. The accumulation of the floating point status information may be conducted in an associative or commutative flag combining operation.

Accumulation circuit 10 then generates a result in the form of a floating point value, at least part of which comprises the accumulated floating point status information. Since the floating point status information is part of the floating point representation of the result, instead of being separate and apart from the result, there is no need to access any external circuitry (e.g., floating point status register). Thus, the implicit serialization that is required by maintaining the floating point status information separate and apart from the result can be advantageously obviated.

Figure 2:
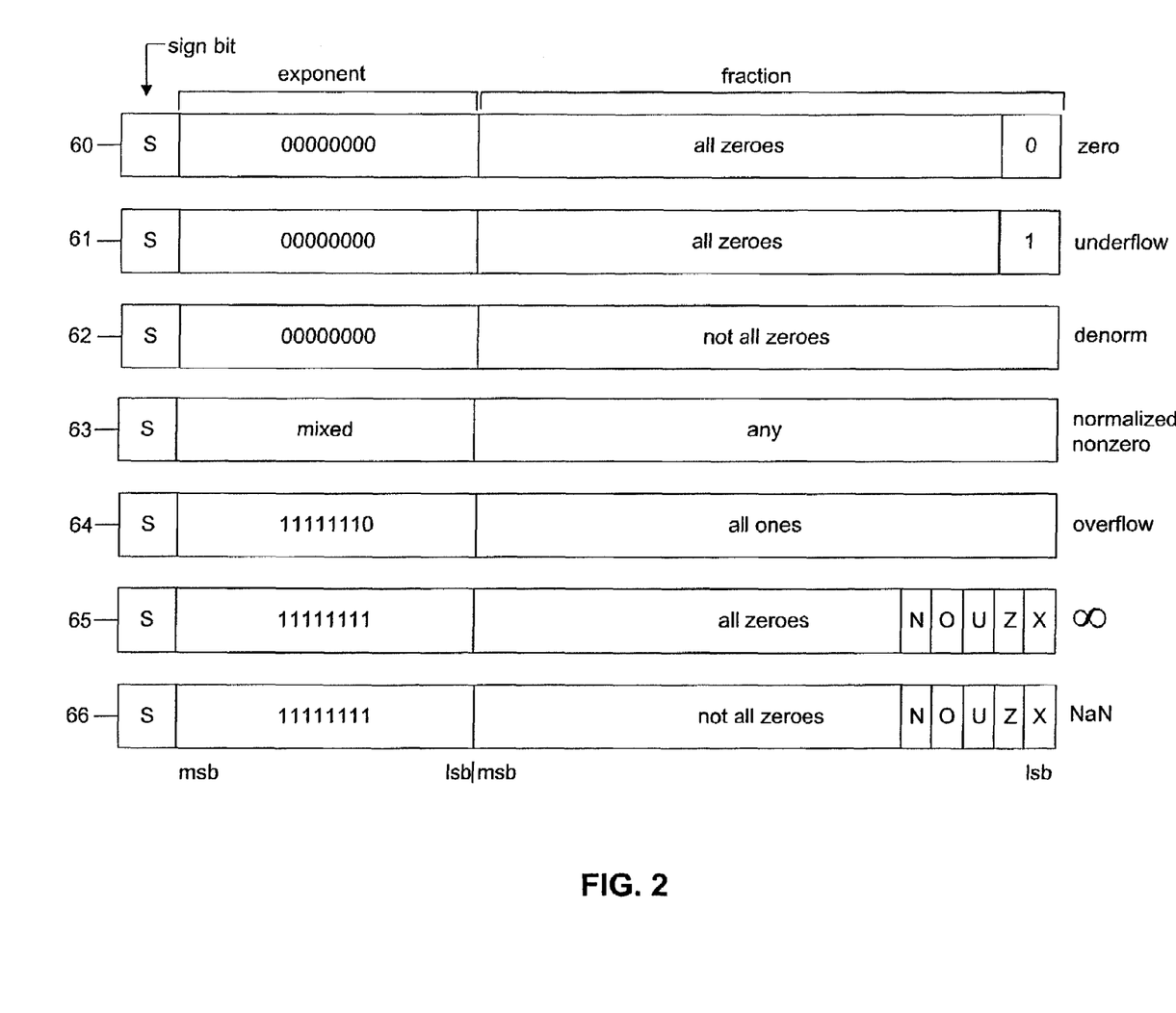
FIG. 2 depicts exemplary formats for representations of floating point operands used by the floating point status information accumulation circuit depicted in FIG. 1, and which is consistent with an exemplary embodiment of the present invention.

The floating point status information accumulation circuit 10 encodes the floating point status information in results that are generated in a plurality of exemplary formats, which will be illustrated in connection with FIG. 2. FIG. 2 depicts exemplary formats of floating point operands that the floating point status information accumulation circuit 10 may receive and of results that it may generate. With reference to FIG. 2, seven exemplary formats are depicted, including a zero format 60, an underflow format 61, a denormalized format 62, a normalized non-zero format 63, an overflow format 64, an infinity format 65, and a not-a-number (NaN) format 66. The exemplary zero format 60 is used to represent the values "zero" or, more specifically, positive or negative zero, depending on the value of "s," the sign bit.

The exemplary underflow format 61 provides a mechanism by which the floating point status information accumulation circuit 10 can indicate that the result of a computation is an underflow. In the underflow format, the sign bit "s" indicates whether the result is positive or negative, the bits $e_{msb} \ldots e_{lsb}$ of the exponent field are all binary zero's, and the bits $f_{msb} \ldots f_{lsb+1}$ of the fraction field, except for the least-significant bit, are all binary zero's. The least significant bit $f_{lsb}$ of the fraction field is a binary one.

The exemplary denormalized format 62 and normalized non-zero format 63 are used to represent finite non-zero floating point values substantially along the lines of that described above in connection with IEEE Std. 754. In both formats 62 and 63, the sign bit "s" indicates whether the result is positive or negative. The bits $e_{msb} \ldots e_{lsb}$ of the exponent field of the denormalized format 62 are all binary zero's. However, the bits $e_{msb} \ldots e_{lsb}$ of the exponent field of the normalized non-zero format 63 are mixed one's and zero's, except that the exponent field of the normalized non-zero format 63 will not have a pattern in which bits $e_{msb} \ldots e_{lsb+1}$ are all binary ones and the least significant bit $e_{lsb}$ is zero and all of the bits $f_{msb} \ldots f_{lsb}$ of the fraction field are all binary one's. In exemplary denormalized format 62, the bits $f_{msb} \ldots f_{lsb}$ of the fraction field are not all binary zero's.

The exemplary overflow format 64 provides a mechanism by which the floating point status information accumulation circuit 10 can indicate that the result of a computation is an overflow. In the overflow format 64, the sign bit "s" indicates whether the result is positive or negative, the bits $e_{msb} \ldots e_{lsb+1}$ of the exponent field are all binary ones, with the least-significant bit $e_{lsb}$ being zero. The bits $f_{msb} \ldots f_{lsb}$ of the fraction field are all binary ones.

The exemplary infinity format 65 provides a mechanism by which the floating point status information accumulation circuit 10 can indicate that the result is infinite. In the infinity format 65, the sign bit "s" indicates whether the result is positive or negative, the bits $e_{msb} \ldots e_{lsb}$ of the exponent field are all binary ones, and the bits $f_{msb} \ldots f_{lsb+5}$ of the fraction field are all binary zero's. The five least-significant bits $f_{lsb+4} \ldots f_{lsb}$ of the fraction field are flags, which will be described below.

The exemplary NaN (not-a-number) format 66 provides a mechanism by which the floating point status information accumulation circuit 10 can indicate that the result is not a number. In the NaN format, the sign bits "s" can be any value, the bits $e_{msb} \ldots e_{lsb}$ of the exponent field are all binary ones, and the bits $f_{msb} \ldots f_{lsb+5}$ of the fraction field are not all binary zero's. The five least significant bits $f_{lsb+4} \ldots f_{lsb}$ of the fraction field are flags, which will be described below.

As noted above, in values represented in the exemplary infinity format 65 and the exemplary NaN format 66, the five low order bits $f_{lsb+4} \ldots f_{lsb}$ of the fraction field are flags. In one embodiment, the formats used with the floating point status information accumulation circuit 10 include the five flags that are defined by IEEE Std. 754. These flags include an invalid operation flag "n," and overflow flag "o," an underflow flag "u," a division-by-zero flag "z", and an inexact flag "x". For example, a value in the NaN format 66 in which both the overflow flag "o" and the division-by-zero flag "z" are set indicates that the value represents a result of a computation that involved an overflow (this from the overflow flag "o"), as well as an attempt to divide by zero (this from the division-by-zero flag "z").

In one embodiment, the flags may provide the same status information as provided by, for example, information stored in a floating point status register in a prior art floating point unit. In this embodiment, the information is provided as part of the result and stored therewith in registers in which the result is ultimately stored. Therefore, multiple instructions can be contemporaneously executed and the floating point status information that may be generated during execution of one instruction, when stored, will not over-write previously-stored floating point status information generated during execution of another instruction.

In another embodiment, values in the other formats can be indicated as being inexact based in part on the least-significant bit $f_{lsb}$ of their fraction fields. In that embodiment, that particular bit operates as an inexact flag. Thus, the value will be indicated as being inexact if the particular bit, such as the $f_{lsb}$, has the value "one". Otherwise, the operand has an exact status.

With this background on the exemplary operand formats, the structure and operation of exemplary accumulation circuit 10 will be described in connection with FIG. 1. Generally, embodiments of the invention provide an arrangement, in the form of the floating point status information accumulation circuit 10, that accumulates floating point status information, as represented by the flags within a plurality of floating point values. The floating point values from which floating point status information is accumulated may be results of, for example, successive floating point operations. In basic operation, the floating point status information accumulation circuit 10 receives two operands and generates in response a value in the exemplary NaN format 66. If:
 (A) both operands are values in the exemplary infinity format 65 or the exemplary NaN format 66,
  (a) the flags of the result will be the flag-wise OR of the respective flags "n," "o," "u," "z," and "x" of the two operands, and (b) if:
  (i) both operands are in the exemplary NaN format 66, the most significant bits $f_{msb} \ldots f_{lsb+5}$ of the fraction field of the result will correspond to the corresponding bits of the operand that has the larger binary-encoded value,
  (ii) one operand is in the exemplary NaN format 66 and the other operand is in the infinity format, the most significant bits $f_{msb} \ldots f_{lsb+5}$ of the fraction field of the result will correspond to the corresponding bits of the operand that is in the exemplary NaN format 66, and
  (iii) otherwise (e.g., if both operands are in the exemplary infinity format 65), the most significant bits $f_{msb} \ldots f_{lsb+5}$ of the fraction field of the result will correspond to a predetermined bit pattern 000000000000000001;

(B) one operand is a value in the exemplary infinity format 65 or the exemplary NaN format 66, and the other operand is not in the exemplary infinity format 65, the exemplary NaN format 66, the exemplary overflow format 64, or the exemplary underflow format 61,
  (a) flags "n," "o," "u," and "z" of the result will correspond to the respective flags of the operand that is in the NaN format 66 or infinity format 65,
  (b) the inexact flag "x" of the result will be the logical OR of the inexact flags of the two operands, and
  (c) if:
    (i) the one operand is in the exemplary NaN format 66, the most significant bits $f_{msb} \ldots f_{lsb+5}$ of the fraction field of the result will correspond to the corresponding bits of the operand that is in the exemplary NaN format 66, and
    (ii) otherwise (e.g., if the one operand is in the infinity format 65), the most significant bits $f_{msb} \ldots f_{lsb+5}$ of the fraction field of the result will correspond to a predetermined bit pattern 000000000000000001;

(C) neither operand is a value in the exemplary infinity format 65, the exemplary NaN format 66, the exemplary overflow format 64 or the exemplary underflow format 61,
  (a) all flags "n," "o," "u," and "z" of the result will be clear,
  (b) the inexact flag "x" of the result will be the logical OR of the inexact flags of the two operands, and
  (c) the most significant bits $f_{msb} \ldots f_{lsb+5}$ of the fraction field of the result will correspond to a predetermined bit pattern 000000000000000001;

(D) neither operand is a value in the exemplary infinity format 65 or the exemplary NAN format 66, but at least one operand is in the exemplary overflow format 64 or the exemplary underflow format 61,
  (a) flags "n" and "z" of the result will be clear,
  (b) overflow flag "o" of the result will be set if either operand is in the overflow format 64,
  (c) underflow flag "u" of the result will be set if either operand is in the underflow format 61,
  (d) the inexact flag "x" of the result will be the logical OR of the inexact flags of the two operands, and
  (e) the most significant bits $f_{msb} \ldots f_{lsb+5}$ of the fraction field of the result will correspond to a predetermined bit pattern 000000000000000001;

(E) one operand is a value in the exemplary infinity format 65 or the exemplary NaN format 66, and the other operand is in the exemplary overflow format 64:
  (a) flags "n," "u," and "z" of the result will correspond to the respective flags of the operand that is in the NaN format 66 or the infinity format 65,
  (b) the inexact flag "x" of the result will be the logical OR of the inexact flags of the two operands,
  (c) the "o" flag of the result will be set, and
  (d) if:
    (i) the one operand is in the exemplary NaN format 66, the most significant bits $f_{msb} \ldots f_{lsb+5}$ of the fraction field of the result will correspond to the corresponding bits of the operand that is in the exemplary NaN format 66, and
    (ii) otherwise (e.g., if the one operand is in the exemplary infinity format 65) the most significant bits $f_{msb} \ldots f_{lsb+5}$ of the fraction field of the result will correspond to a predetermined bit pattern 000000000000000001; and (F) one operand is a value in the exemplary infinity format 65 or the exemplary NaN format 66, and the other operand is in the exemplary underflow format 64:
  (a) flags "n," "o," and "z" of the result will correspond to the respective flags of the operand that is in the NaN format 66 or the infinity format 65,
  (b) the inexact flag "x" of the result will be the logical OR of the inexact flags of the two operands,
  (c) the "u" flag of the result will be set, and
  (d) if:
    (i) the one operand is in the exemplary NaN format 66, the most significant bits $f_{msb} \ldots f_{lsb+5}$ of the fraction field of the result will correspond to the corresponding bits of the operand that is in the exemplary NaN format 66, and
    (ii) otherwise (e.g., if the one operand is in the exemplary infinity format 65) the most significant bits $f_{msb} \ldots f_{lsb+5}$ of the fraction field of the result will correspond to a predetermined bit pattern 000000000000000001.

In all the above mentioned cases, the sign bit "s" of the result will correspond to the logical OR of the sign bits "s" of the operands.

It will be appreciated that, if one operand is in the exemplary overflow format 64 and the other operand is in the exemplary underflow format 61 (reference item (D) above), both the overflow flag "o" and the underflow flag "u" of the result will be set.

As noted above, in all cases the result will be in the exemplary NaN format 66, regardless of the formats of the operands, and, if neither operand is in the NaN format 66, the floating point status information accumulation circuit 10 generates a result (also called an accumulated result) in the exemplary NaN format 66 with the most significant bits $f_{msb} \ldots f_{lsb+5}$ of the fraction field having the bit pattern 000000000000000001. It will be appreciated that this bit pattern has the lowest possible binary-encoded value. In this case, if the result is subsequently used as an operand in the floating point status information accumulation circuit 10 and if the other operand is a value in the exemplary NaN format 66 in which the most significant bits $f_{msb} \ldots f_{lsb+5}$ of the fraction field has a higher value, the floating point status information accumulation circuit 10 will generate a result in which the most significant bits $f_{msb} \ldots f_{lsb+5}$ of the fraction field corresponds to the most significant bits $f_{msb} \ldots f_{lsb+5}$ of the fraction field of the other operand (reference item (A) above).

In addition, it will be appreciated that, since the most significant bits $f_{msb} \ldots f_{lsb+5}$ of the fraction field of values in the infinity format 65 have the bit pattern 000000000000000000, the binary-encoded value of that portion of the fraction field will be less than the binary-encoded value of the most significant bits $f_{msb} \ldots f_{lsb+5}$ of the fraction field of any value in the exemplary NaN format 66.

With reference to FIG. 1, the illustrated embodiment of the floating point status information accumulation circuit 10 has two operand buffers 11A and 11B, respective operand analysis circuits 12A and 12B, a decision circuit 13, and a result assembler 14. The operand buffers 11A and 11B receive and store respective operands from, for example, a set of registers (not shown) in a conventional manner. Each operand analysis circuit 12A and 12B analyzes the operand in the respective buffer 11A and 11B, and generates signals providing information relating to the respective operands, which are provided to the decision circuit 13. The signals provided by the respective operand analysis circuit 12A and 12B essentially indicate whether the format of the respective operand is in one of the exemplary formats, such as the underflow format 61, the overflow format 64, the infinity format 65, or the NaN format 66. The decision circuit 13 receives the signals from the operand analysis circuits 12A and 12B and generates control signals that control the result assembler 14 in assembling the result. The result assembler 14 receives information from a number of sources, including the operand buffers 11A and 11B, and several predetermined value stores as described below. Under control of control signals from the decision circuit 13 and signals from the operand analysis circuits 12A and 12B, result assembler 14 assembles the result, which is provided on a result bus 17. Result bus 17, in turn, may deliver the result to any convenient destination, such as a register in a register set (not shown), for storage or other use.

As noted above, each operand analysis circuit 12A and 12B analyzes the operand in the respective buffer 11A and 11B and generates signals providing information relating to the respective operands. In the illustrated embodiment, each exemplary operand analysis circuit 12A and 12B comprises a number of comparators, including:

(i) a comparator 20A and 20B that generates an asserted signal if the bits $e_{msb} \ldots e_{lsb}$ of the exponent field of the operand in respective buffer 11A and 11B are all binary one's, which will be the case if the operand is in the exemplary infinity format 65 or the exemplary NaN format 66;

(ii) a comparator 21A and 21B that generates an asserted signal if the bits $e_{msb} \ldots e_{lsb+1}$ of the exponent field of the operand in the respective buffer 11A and 11B are all binary one's, and the bit $e_{lsb}$ is a binary zero, which will be the case if the operand is in the exemplary overflow format 64;

(iii) a comparator 22A and 22B that generates an asserted signal if the bit $e_{msb} \ldots e_{lsb}$ of the exponent field of the operand in respective buffer 11A and 11B are all binary zero's, which will be the case if the operand is in one of the exemplary formats, such as the zero format 60, underflow format 61, or denormalized format 62;

(iv) a comparator 30A and 30B that generates an asserted signal if the bits $f_{msb} \ldots f_{lsb+5}$ of the fraction field of the operand in the respective buffer 11A and 11B are all binary one's, which may be the case if the operand is in one of the exemplary formats, such as the denormalized format 62, normalized non-zero format 63, overflow format 64, or NaN format 66;

(v) a comparator 31A and 31B that generates an asserted signal if the bits $f_{msb} \ldots f_{lsb+5}$ of the fraction field of the operand in the respective buffer 11A and 11B are all binary zero's, which may be the case if the operand is in one of the exemplary formats, such as the zero format 60, underflow format 61, denormalized format 62, normalized non-zero format 63, or infinity format 65;

(vi) a comparator 32A and 32B that generates an asserted signal if the bits $f_{lsb+4} \ldots f_{lsb}$ of the fraction field of the operand in the respective buffer 11A and 11B are all binary one's, which may be the case if the operand is in one of the exemplary formats, such as the denormalized format 62, normalized non-zero format 63, overflow format 64, or if all of the flags "n," "o," "u," "z," and "x" are set in the infinity format 65 or NaN format 66; and (vii) a comparator 33A and 33B that generates an asserted signal if the bits $f_{lsb+4} \ldots f_{lsb+1}$ of the fraction field of the operand in the respective buffer 11A and 11B are all binary zero's and if the bit $f_{lsb}$ of the fraction field is a binary "one," which may be the case if the operand is in one of the exemplary formats, such as the underflow format 61, the denormalized format 62, the normalized non-zero format 63, or if the flags "n," "o," "u," and "z" are clear and the flag "x" is set, in the infinity format 65 or NaN format 66.

In the illustrated embodiment, each operand analysis circuit 12A and 12B also includes combinatorial logic elements that receive selected signals from the comparators and generate asserted signals to provide indications as to certain characteristics of the respective operand, including:

(i) an AND gate 36A and 36B that may generate an asserted signal if comparators 22A, 22B, 31A, 31B, 33A, and 33B are all generating asserted signals, which may be the case if the bits $e_{msb} \ldots e_{lsb}$ of the exponent field of the operand in the respective buffer have the bit pattern 00000000 and bits $f_{msb} \ldots f_{lsb}$ of the fraction field of the operand in the respective operand buffer 11A and 11B have the bit pattern 00000000000000000000001 (it will be appreciated that if the AND gate 36A and 36B is generating an asserted signal, the operand in the respective operand buffer is in the exemplary underflow format 31);

(ii) an AND gate 37A and 37B that may generate an asserted signal if comparators 21A, 21B, 30A, 30B, 32A, and 32B are all generating asserted signals, which may be the case if the bits $e_{msb} \ldots e_{lsb}$ of the exponent field of the operand in the respective buffer have the bit pattern 11111110 and bits $f_{msb} \ldots f_{lsb}$ of the fraction field of the operand in the respective operand buffer 11A and 11B have the bit pattern 11111111111111111111 (it will be appreciated that if the AND gate 37A or 37B is generating an asserted signal, the operand in the respective operand buffer is in the exemplary overflow format 64); and (iii) a NAND gate 38A and 38B that may generate an asserted signal if comparator 20A and 20B is generating an asserted signal and comparator 31A and 31B is generating a negated signal, which may be the case if the bits $e_{msb} \ldots e_{lsb}$ of the exponent field of the operand in the respective buffer have the bit pattern 11111111 and at least one bit $f_{msb} \ldots f_{lsb}$ of the fraction field of the operand in the respective operand buffer 11A and 11B has the value "one" (it will be appreciated that if the NAND gate 38A and 38B is generating an asserted signal, the operand in the respective operand buffer is in the exemplary NaN format 66).

As noted above, the decision circuit 13 receives the signals from the operand analysis circuits 12A and 12B and generates control signals that control the result assembler 14 in assembling the result. In the illustrated embodiment, the decision circuit 13 comprises:

(i) a comparator 40 that generates an asserted signal if the binary-encoded value of the bits $f_{msb} \ldots f_{lsb+5}$ of the fraction field of the operand in operand buffer 11A is greater than the binary-encoded value of the bits $f_{msb} \ldots f_{lsb+5}$ of the fraction field of the operand in operand buffer 11B; otherwise, a negated signal is generated by comparator 40;

(ii) a NOR gate 41 that generates an asserted signal if the comparator 40 is generating an asserted signal or if the NAND gate 38B is generating a negated signal;

(iii) a NOR gate 42 that generates an asserted signal if either the comparator 40 or the NAND gate 38A is generating a negated signal;

(iv) an AND gate 43 that generates an asserted signal if both the NAND gate 38A and the NOR gate 41 are generating asserted signals;

(v) an AND gate 44 that generates an asserted signal if both the NAND gate 38B and the NOR gate 42 are generating asserted signals;

(vi) a NAND gate 45 that generates an asserted signal if both the NAND gate 38A and the NAND gate 38B are generating negated signals;

(vii) an OR gate 46 that generates an asserted signal if either AND gate 36A or AND gate 36B is generating an asserted signal; and (viii) an OR gate 47 that generates an asserted signal if either AND gate 37A or AND gate 37B is generating an asserted signal.

Regarding exemplary decision circuit 13, it will be further appreciated that:

(1) AND gate 43 (reference item (iv) above) will generate an asserted signal if both:
  (i) the operand in operand buffer 11A is in the exemplary NaN format 66, and
  (ii) either:
    (a) the operand in operand buffer 11B is not in the exemplary NaN format 66, or
    (b) the binary-encoded operand of the bits $f_{msb} \ldots f_{lsb+5}$ of the fraction field of the operand in operand buffer 11A is greater than the binary-encoded operand of the bits $f_{msb} \ldots f_{lsb+5}$ of the fraction field of the operand in operand buffer 11B;

(2) AND gate 44 (reference item (v) above) will generate an asserted signal if both:
  (i) the operand in operand buffer 11B is in the exemplary NaN format 66, and
  (ii) either:
    (a) the operand in operand buffer 11A is not in the exemplary NaN format 66, or
    (b) the binary-encoded operand of the bits $f_{msb} \ldots f_{lsb+5}$ of the fraction field of the operand in operand buffer 11A is not greater than (i.e., is less than or equal to) the binary-encoded operand of the bits $f_{msb} \ldots f_{lsb+5}$ of the fraction field of the operand in operand buffer 11B;

(3) AND gate 45 (reference item (vi) above) will generate an asserted signal if both:
  (i) the operand in operand buffer 11A is not in the exemplary NaN format 66, and
  (ii) the operand in operand buffer 11B is not in the exemplary NaN format 66;

(4) OR gate 46 (reference item (vii) above) will generate an asserted signal if the operand in either operand buffer 11A or 11B is in the exemplary underflow format 61; and (5) OR gate 47 (reference item (viii) above) will generate an asserted signal if the operand in either operand buffer 11A or 11B is in the exemplary overflow format 64.

As noted above, the result assembler 14 receives information from a number of sources, including the operand buffers 11A and 11B, and several predetermined value stores. Under the control of control signals from the decision circuit 13 and signals from the operand analysis circuits 12A and 12B, result assembler 14 assembles the result, which is provided on the result bus 17. In one embodiment, the result assembler 14 may assemble the result in four segments, including a sign segment that represents the sign bit of the result, an exponent segment that represents the exponent field of the result, a high-order fraction segment that represents the bits $f_{msb} \ldots f_{lsb+5}$ of the fraction field of the result, and a low-order fraction segment that represents the five least-significant bits $f_{lsb+4} \ldots f_{lsb}$ of the result. It will be appreciated that the low-order fraction segment corresponds to the flags "n," "o," "u," "z," and "x."

More specifically and in accordance with the illustrated embodiment in FIG. 1, the exemplary result assembler 14 may be comprised of four elements, including an OR gate 50, a predetermined value store 51, a selector 52 and a combiner circuit 53. The OR gate 50 receives signals from the operand buffers 11A and 11B representative of the sign bits of the respective operands and generates an output signal representative of the logical OR of the respective signals. The output signal generated by the OR gate 50 is coupled onto the result bus 17 as the sign segment of the result.

The predetermined value store 51 stores a value that corresponds to the bit pattern 11111111, which corresponds to the bit pattern of the bits $e_{msb} \ldots e_{lsb}$ comprising the exponent field of values in the exemplary NaN format 66. The predetermined value store 51 couples signals representative of the bit pattern stored therein onto the result bus as the exponent segment of the result.

The selector 52 couples high-order fraction field signals representative of the high-order fraction field bits $f_{msb} \ldots f_{lsb+5}$ of the fraction field of the result to the result bus 17. The selector 52 receives three sets of high-order fraction field value signals, namely, signals representative of bits $f_{msb} \ldots f_{lsb+5}$ of the fraction field of the operand in buffer 11A, signals representative of bits $f_{msb} \ldots f_{lsb+5}$ of the fraction field of the operand in buffer 11B, and a set of signals representative of a predetermined high-order fraction field bit pattern 000000000000000001. In addition, the selector 52 receives control signals from the decision circuit 13, specifically from AND gates 43, 44, and 45. Each control signal is associated with one of the sets of high-order fraction field value signals. In the illustrated embodiment, it will be appreciated that exactly one of the signals from AND gates 43, 44, and 45 will be asserted at any point in time and, when a control signal is asserted, the selector 52 will couple high-order fraction field value signals associated with the asserted control signal to the result bus 17 as the high-order fraction segment. Accordingly, if the signal from the AND gate 43 is asserted, the selector 52 will couple signals representative of bits $f_{msb} \ldots f_{lsb+5}$ of the fraction field of the operand in buffer 11A to the result bus as the high-order fraction field segment. As noted above (reference items (1) above), this will occur if both:
  (i) the operand in operand buffer 11A is in the exemplary NaN format 66, and
  (ii) either:
    (a) the operand in operand buffer 11B is not in the exemplary NaN format 66, or
    (b) the binary-encoded operand of the bits $f_{msb} \ldots f_{lsb+5}$ of the fraction field of the operand in operand buffer 11A is greater than the binary-encoded operand of the bits $f_{msb} \ldots f_{lsb+5}$ of the fraction field of the operand in operand buffer 11B.

On the other hand, if the signal from the AND gate 44 is asserted, the selector 52 will couple signals representative of bits $f_{msb} \ldots f_{lsb+5}$ of the fractional field of the operand in buffer 11B to the result bus as the high-order fraction field segment. As noted above (reference item (2) above), this will occur if both:

(i) the operand in operand buffer 11B is in the exemplary NaN format 66, and (ii) either:

(a) the operand in operand buffer 11A is not in the exemplary NaN format 66, or (b) the binary-encoded operand of the bits $f_{msb} \ldots f_{lsb+5}$ of the fraction field of the operand in operand buffer 11A is not greater than (i.e., is less than or equal to) the binary-encoded operand of the bits $f_{msb} \ldots f_{lsb+5}$ of the fraction field of the operand in operand buffer 11B.

Finally, if the signal from the AND gate 46 is asserted, the selector 52 will couple signals representative of the predetermined high-order fraction field bit pattern 000000000000000001 to the result bus as the high-order fraction field segment. As noted above (reference item (3) above), this will occur if both:

(i) the operand in operand buffer 11A is not in the exemplary NaN format 66, and (ii) the operand in operand buffer 11B is not in the exemplary NaN format 66.

The combiner 53 couples low-order fraction field value signals representative of the low-order fraction field bits $f_{lsb+4} \ldots f_{lsb}$ of the fraction field of the result to the result bus 17. The combiner 53 receives signals representative of bits $f_{lsb+4} \ldots f_{lsb}$ of the fraction field of the operand in buffer 111A, signals representative of bits $f_{lsb+4} \ldots f_{lsb}$ of the fraction field of the operand in buffer 11B, and signals from OR gates 46 and 47. In addition, the combiner 53 receives signals from the comparators 20A and 20B. If the comparator 20A is generating an asserted signal, which may be the case if the operand in operand buffer 11A is in the exemplary infinity format 65 or the exemplary NaN format 66, the least-significant bits $f_{lsb+4} \ldots f_{lsb}$ of the operand buffer 11A will contribute to the least-significant bits $f_{lsb+4} \ldots f_{lsb}$ of the result. Similarly, if the comparator 20B is generating an asserted signal, which may be the case if the operand in operand buffer 11B is in the exemplary infinity format 65 or the exemplary NaN format 66, the least-significant bits $f_{lsb+4} \ldots f_{lsb}$ of the operand in operand buffer 11B will contribute to the least-significant bits $f_{lsb+4} \ldots f_{lsb}$ of the result. The signal from the OR gate 46 will be asserted, if the operand in either operand buffer 11A or 11B is in the exemplary underflow format 61, and will contribute to the bit $f_{lsb+2}$ of the result, which corresponds to the underflow flag "u." Similarly, the signal from the OR gate 47 will be asserted if the operand in either operand buffer 11A or 11B is in the overflow format 64 and will contribute to the bit $f_{lsb+3}$ of the result, which corresponds to the overflow flag "o." Except in the embodiment described above in which the least-significant bit $f_{lsb}$ of the fraction field of values in all formats comprise inexact flags, the least-significant bits $f_{lsb+4} \ldots f_{lsb}$ of values in other formats will not contribute to the bits $f_{lsb+4} \ldots f_{lsb}$ of the fraction field of the result. In the embodiment in which the least-significant bit $f_{lsb}$ of the fraction field of values in all formats comprise inexact flags, the least-significant bit $f_{lsb}$ of values in all formats will contribute to the bit $f_{lsb}$ of the fraction field of the result.

In the following, it will be assumed that the floating point status information accumulation unit 10 comprises the embodiment in which the least-significant bit $f_{lsb}$ of the fraction field of values in all formats comprise inexact flags. In that embodiment, the combiner 53 comprises a plurality of OR gates 54(0) through 54(4). OR gate 54(0) receives signals representative of the least-significant bits $f_{lsb}$ of the fraction field of both operand buffers 11A and 11B and couples an output signal representative of the OR thereof onto the result bus 17 as the least-significant bit $f_{lsb}$ of the result. Since the result is in the exemplary NaN format 66, the signal provided by the OR gate 54(0) is representative of the inexact flag "x."

Each of the other OR gates 54(1) through 54(4) (generally identified by reference numeral 54($i$)) is associated with two AND gates 55($i$)(A) and 55($i$)(B). Each AND gate 55($i$)(A) receives, as one input, a signal representative of the bit $f_{lsb+i}$ of the fraction field of the operand in operand buffer 11A; and as its other input, the signal generated by comparator 20A. If the signal generated by comparator 20A is asserted, which may be the case if the operand in operand buffer 11A is in the exemplary infinity format 65 or the exemplary NaN format 66, the AND gate 55($i$)(A) is energized to couple the signal representative of the bit $f_{lsb+i}$ of the fraction field of the operand in operand buffer 11A to its output. The output of each AND gate 55($i$)(A) is coupled to one input of the respective OR gate 54($i$).

Similarly, each AND gate 55($i$)(B) receives, as one input, a signal representative of the bit $f_{lsb+i}$ of the fraction field of the operand in operand buffer 11B; and as its other input, the signal generated by comparator 20B. If the signal generated by comparator 20B is asserted, which may be the case if the operand in operand buffer 11B is in the exemplary infinity format 65 or the exemplary NaN format 66, the AND gate 55($i$)(B) is energized to couple the signal representative of the bit $f_{lsb+i}$ of the fraction field of the operand in operand buffer 11B to its output. The output of each AND gate 55($i$)(B) is coupled to one input of the respective OR gate 54($i$).

OR gates 54($i$) receive the signals provided by respective AND gates 55($i$)(A) and 55($i$)(B); and, in the case of OR gates 54(2) and 54(3), signals provided by OR gates 46 and 47. OR gates 54($i$) couple output signals representative of the OR thereof onto the result bus 17 as respective bit $f_{lsb+1}$ of the result. Accordingly, if the operand in respective operand buffer 11A and 11B is in the exemplary infinity format 65 or the exemplary NaN format 66, the least-significant bits $f_{lsb+4} \ldots f_{lsb+1}$ of its fraction field, which, as noted above, comprise flags "n," "o," "u," and "z," will contribute to the bits $f_{lsb+4} \ldots f_{lsb+1}$ of the fraction field of the result. In addition, since the signals provided by OR gates 46 and 47 are used by the OR gates 54(2) and 54(3) in generating their output signals, the bits $f_{lsb+2}$ and $f_{lsb+3}$ of the fraction field of the result, which correspond to the "u" and "o" flags, respectively, also indicate whether the operand in operand buffer 11A and 11B is in the respective exemplary underflow format 61 or overflow format 64.

The embodiments of the invention provide a number of advantages. In particular, the accumulation circuit 10 is provided in a system in which floating point status information associated with a value in a floating point representation is embedded or encoded in the representation. The arrangement in the form of a floating point status information accumulation circuit 10 facilitates the accumulation of floating point status information from a plurality of floating point values in another floating point value. This advantageously obviates the necessity of providing separate floating point status registers to store either the floating point status information of the plurality of floating point values or the accumulated floating point status information.

One of ordinary skill in the art will recognize that other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated. As a further example, an alternative embodiment could deliver a status-containing result represented in more bits, or fewer bits, than the number of bits used to represent one of the operands. As still another example, an alternative embodiment might accept one operand in the form of a floating point number with embedded flag status information, and accept another operand or produce a result in the form of some other data structure with embedded flag status information without departing from the principles of the present invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided into the system over a network or other mechanism for transferring information in a conventional manner. In addition, it will be appreciated that the system may be operated and/or otherwise controlled by means of information provided by an operator using operator input elements (not shown), which may be connected directly to the system or which may transfer the information to the system over a network or other mechanism for transferring information in a conventional manner.

It will also be appreciated that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A flag combining circuit, comprising:
    an analysis circuit that receives a plurality of operands each of which having encoded status flag information, the analysis circuit being operative to analyze the plurality of operands and to provide an indication of one or more predetermined formats in which the plurality of operands are represented; and
    a result assembler that receives the indication from the analysis circuit and assembles an accumulated result that represents a value and combines the encoded status flag information from each of the plurality of operands.

2. The flag combining circuit of claim 1, wherein at least one of the plurality of operands is a floating point operand.

3. The flag combining circuit of claim 1, further comprising one or more operand buffers that receive the plurality of operands and transfers them to the analysis circuit.

4. The flag combining circuit of claim 1, further comprising a decision circuit that receives the indication from the analysis circuit and provides a second indication to the result assembler.

5. The flag combining circuit of claim 1, wherein the predetermined formats represent a zero format, an overflow format, an underflow format, a denormalized format, a normalized non-zero format, an infinity format, and a not-a-number (NaN) format.

6. The flag combining circuit of claim 5, wherein the overflow format represents one of a +OV status and a −OV status.

7. The flag combining circuit of claim 6, wherein the overflow format includes a set inexact status flag.

8. The flag combining circuit of claim 5, wherein the underflow format represents one of a +UN status and a −UN status.

9. The flag combining circuit of claim 8, wherein the underflow format includes a set inexact status flag.

10. The flag combining circuit of claim 5, wherein a least significant bit in the plurality of operands represents a set inexact status flag.

11. The flag combining circuit of claim 1, wherein encoded status flag information represents an invalid operation flag, an overflow flag, an underflow flag, a division by zero flag, and an inexact flag.

12. The flag combining circuit of claim 1, wherein the accumulated result produced is assembled using one of a commutative and an associative flag-combining operation.

13. The flag combining circuit of claim 1, wherein the accumulated result produced is in a NaN format.

14. The flag combining circuit of claim 13, wherein at least one of the plurality of operands is in the NaN format.

15. The flag combining circuit of claim 1, wherein the accumulated result represents information from one of the plurality of operands that has a larger fraction field.

16. The flag combining circuit of claim 1, wherein a sign bit in the accumulated result is a logical OR of sign bits in the plurality of operands.

17. The flag combining circuit of claim 1, wherein the result assembler produces the accumulated result in a NaN formatted one of the plurality of operands.

18. A method for combining flag information, comprising the steps of:
    receiving a plurality of operands, each of which having encoded status flag information;
    analyzing, using an accumulation circuit, the plurality of operands to provide indications of one or more predetermined formats in which the plurality of operands are represented;
    generating control signals based on the indications of the one or more predetermined formats; and
    assembling an accumulated result based at least upon the generated control signals and input signals, the accumulated result representing a value and combining the encoded status flag information from each of the plurality of operands.

19. The method of claim 18, wherein receiving the plurality of operands includes receiving at least one floating point operand.

20. The method of claim 18, wherein analyzing the plurality of operands includes providing an indication of predetermined formats representing a zero format, an overflow format, an underflow format, a denormalized format, a normalized non-zero format, an infinity format, and a not-a-number (NaN) format.

21. The method of claim 20, wherein the overflow format represents one of a +OV status and a −OV status.

22. The method of claim 21, wherein the overflow format includes a set inexact status flag.

23. The method of claim 20, wherein the underflow format represents one of a +UN status and a −UN status.

24. The method of claim 23, wherein the underflow format includes a set inexact status flag.

25. The method of claim 18, wherein encoded status flag information represents an invalid operation flag, an overflow flag, an underflow flag, a division by zero flag, and an inexact flag.

26. The method of claim 18, wherein assembling the accumulated result includes using one of a commutative and an associative flag-combining operation.

27. The method of claim 18, wherein assembling the accumulated result produces a result in a not-a-number (NaN) format.

28. The method of claim 27, wherein at least one of the plurality of operands is in the NaN format.

29. The method of claim 18, wherein assembling the accumulated result includes using at least two of the plurality of operands in a NaN format.

30. The method of claim 29, wherein assembling the accumulated result includes representing information from which of the at least two of the plurality of operands has a larger fraction field.

31. The method of claim 18, wherein a sign bit in the accumulated result is a logical OR of sign bits in the plurality of operands.

32. The method of claim 18, wherein assembling the accumulated result includes producing the accumulated result in a NaN formatted one of the plurality of operands.

33. A computer-readable medium on which is stored a set of instructions for combining operands, which when executed perform steps comprising:
  receiving a plurality of operands, each of which having encoded status flag information;
  analyzing the plurality of operands to provide indications of one or more predetermined formats in which the plurality of operands are represented;
  generating control signals based on the indications of the one or more predetermined formats; and
  assembling an accumulated result based at least upon the generated control signals and input signals, the accumulated result representing a value and combining the encoded status flag information from each of the plurality of operands.

34. The computer-readable medium of claim 33, wherein receiving the plurality of operands includes receiving at least one floating point operand.

35. The computer-readable medium of claim 33, wherein analyzing the plurality of operands includes providing an indication of predetermined formats representing a zero format, an overflow format, an underflow format, a denormalized format, a normalized non-zero format, an infinity format, and a not-a-number (NaN) format.

36. The computer-readable medium of claim 35, wherein the overflow format represents one of a +OV status and a −OV status.

37. The computer-readable medium of claim 36, wherein the overflow format includes a set inexact status flag.

38. The computer-readable medium of claim 35, wherein the underflow format represents one of a +UN status and a −UN status.

39. The computer-readable medium of claim 38, wherein the underflow format includes a set inexact status flag.

40. The computer-readable medium of claim 33, wherein encoded status flag information represents an invalid operation flag, an overflow flag, an underflow flag, a division by zero flag, and an inexact flag.

41. The computer-readable medium of claim 33, wherein assembling the accumulated result includes using one of a commutative and an associative flag-combining operation.

42. The computer-readable medium of claim 33, wherein assembling the accumulated result produces a result in a not-a-number (NaN) format.

43. The computer-readable medium of claim 42, wherein at least one of the plurality of operands is in the NaN format.

44. The computer-readable medium of claim 33, wherein assembling the accumulated result includes using at least two of the plurality of operands in a NaN format.

45. The computer-readable medium of claim 44, wherein assembling the accumulated result includes representing information from which of the at least two of the plurality of operands has a larger fraction field.

46. The computer-readable medium of claim 33, wherein a sign bit in the accumulated result is a logical OR of sign bits in the plurality of operands.

47. The computer-readable medium of claim 33, wherein assembling the accumulated result includes producing the accumulated result in a NaN formatted one of the plurality of operands.

* * * * *